J. F. MULLOWNY & T. S. SHAW.
Gage-Cock.

No. 166,216.  Patented Aug. 3, 1875.

WITNESSES.  INVENTORS.

UNITED STATES PATENT OFFICE.

JOHN F. MULLOWNY, OF PITTSBURG, AND THOMAS S. SHAW, OF CONNELLS-VILLE, PENNSYLVANIA.

IMPROVEMENT IN GAGE-COCKS.

Specification forming part of Letters Patent No. 166,216, dated August 3, 1875; application filed May 18, 1875.

*To all whom it may concern:*

Be it known that we, JOHN F. MULLOWNY, of Pittsburg, in the county of Allegheny and State of Pennsylvania, and THOMAS S. SHAW, of Connellsville, in the county of Fayette and State of Pennsylvania, have invented certain new and useful Improvements in Steam Gage-Cocks; and we do hereby declare the following to be a full, clear, and exact description of the invention, such as will enable others skilled in the art to which it pertains to make and use it, reference being had to the accompanying drawings, which form part of this specification.

Our invention relates to an improvement in steam gage-cocks; and it consists in making the case thereof of hard and brittle metal, and connecting the same with an independent valve-chamber, whereby the gage shall be weakened at a point at or near the surface of the boiler, said devices being constructed and operating as hereinafter set forth and claimed.

The accompanying drawing represents our invention.

Figure 1:
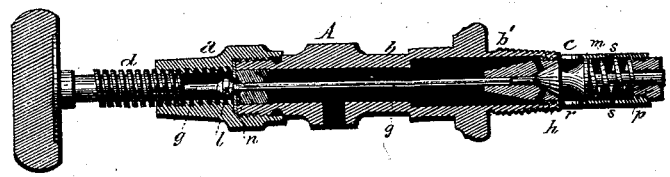
Figure 2:
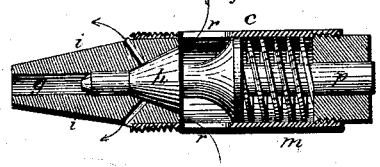

A represents the shell of a gage-cock, which is composed of three parts, the upper or stem part $a$, the lower or vent part $b$, and the valve-chamber $c$ at the bottom. The upper part $a$ is of the usual construction, consisting of a male and female screw, with a suitable handle or wheel on the top, whereby to turn the screw $d$. In the end of the screw $d$ is firmly secured a stem, $g$, which stem extends down to the upper part of the lower valve $h$, and presses upon it when the screw is tightened, whereby the valve is opened. At the upper part of the stem $g$ is a valve, $l$, which, when the valve $h$ has been opened, enters its seat $n$ in the upper end of the part $b$, and thereby closes it effectually. In the side of the part $b$ is a vent-hole for the escape of steam, and at its lower end a screw-thread, by which the shell is secured to the boiler, said screw-thread extending to within a short distance of the flange or ring upon the part $b$, the intermediate space $b'$ between such being slightly lessened in thickness, as shown in Fig. 1, and made brittle, so as to constitute the point of breakage in case of accident. Into the lower end of the part $b$ is secured the valve-chamber $c$, the upper part $i$, entering the part $b'$, being of conical form, with an opening at its apex, for the passage of the stem $g$, and vent-holes at its base. This conical part $i$ should be of such length that when inserted in the shell its end will be about even with the brittle part $b'$, so that in case of breakage the disconnection of the stem $g$ therefrom shall be insured. The conical valve $h$ within the chamber has its seat within the part $i$, and the stem $p$, to which the valve $h$ is attached, passes downward through the bottom of the chamber.

In the walls of the chamber, above an enlargement in the stem $p$, are suitable openings $r$ for the admission of steam, and smaller ones $s$ below this enlargement to counteract an undue pressure of steam from above. Around the stem $p$ is a coiled spring, $m$, which spring keeps the valve $h$ closed when not pressed down by means of the stem $g$ in the end of the screw $d$.

From the position of the valve-chamber below the gage-screw and in the boiler, it is evident that in case of an accident the valve must remain undisturbed should the cock be broken, and the valve would be kept closed by the action of the spring underneath. The conical shape of the upper portion of the chamber, should the break occur very low down, would cause the broken parts of the gage to slip off without injuring the valve. By making the gage of hard and brittle metal at the place where usually the break occurs—viz., immediately above the boiler—a break is insured where it cannot destroy or affect the valve, the valve being not connected with the upper or outside parts.

By this construction and arrangement of parts the shell $b$ may be screwed into the boiler until the flange just above the same lies close thereon, or nearly so, for in each instance, should a violent blow be given to the gage, it will break or be torn away from the boiler at the line $b$ between said flange and the screw-thread, and the lower valve device be left intact.

Having thus described our invention, we claim—

In a steam gage-cock constructed with the herein-described lower independent valve-chamber and spring-valve disconnected from and operated by an upper valve-stem, the shell $b$, having a weak and brittle portion, $b'$, the latter part constituting the point of breakage between the flange and screw-thread, and located with reference to the conical valve-seat $i$, for the purpose specified, all substantially as shown and set forth.

In testimony that we claim the foregoing we have hereunto set our hands and seals this 13th day of May, 1875.

JOHN F. MULLOWNY. [L. S.]
THOMAS S. SHAW. [L. S.]

Witnesses:
W. A. DUNSHEE,
WILLIAM HUNTER.